(12) United States Patent
Heiligenstein et al.

(10) Patent No.: US 10,596,759 B2
(45) Date of Patent: Mar. 24, 2020

(54) EXTRUSION ASSEMBLY FOR AN ADDITIVE MANUFACTURING SYSTEM

(71) Applicant: Chromalox, Inc., Pittsburgh, PA (US)

(72) Inventors: Adam N. Heiligenstein, Gibsonia, PA (US); Paul R. Neilson, Pleasant View, UT (US); Martin P. Konieczny, Roy, UT (US)

(73) Assignee: CHROMALOX, INC., Pittsburgh, PA (US)

( * ) Notice: Subject to any disclaimer, the term of this patent is extended or adjusted under 35 U.S.C. 154(b) by 226 days.

(21) Appl. No.: 15/793,192

(22) Filed: Oct. 25, 2017

(65) Prior Publication Data

US 2019/0118471 A1    Apr. 25, 2019

(51) Int. Cl.
*B29C 64/209* (2017.01)
*B29C 64/295* (2017.01)
(Continued)

(52) U.S. Cl.
CPC .......... *B29C 64/295* (2017.08); *B29C 48/02* (2019.02); *B29C 48/05* (2019.02); *B29C 48/266* (2019.02);
(Continued)

(58) Field of Classification Search
CPC ....... B29C 48/02; B29C 48/05; B29C 48/266; B29C 48/50; B29C 48/6801; B29C 48/6803; B29C 48/832; B29C 48/834; B29C 48/875; B29C 48/92; B29C 2948/92209; B29C 2948/92704; B29C 2948/92895; B29C 64/118; B29C 64/209; B29C 64/227; B29C 64/245; B29C 64/295; B29C 64/393; B33Y 10/00; B33Y 30/00
See application file for complete search history.

(56) References Cited

U.S. PATENT DOCUMENTS 3,750,905 A    8/1973  Wolfrom
4,304,544 A   12/1981  Crandell
(Continued)

FOREIGN PATENT DOCUMENTS

WO    WO2012099824 A2    7/2012
WO    WO 2015/171832 A1  11/2015
WO    WO2017008789 A1    1/2017

*Primary Examiner* — Xiao S Zhao
*Assistant Examiner* — Joseph S Leyson

(57) ABSTRACT

An extrusion assembly, a method of constructing an extrusion assembly, and an additive manufacturing system including an extrusion assembly are disclosed. The extrusion assembly includes an extrusion die; a channel having an inlet and an outlet, which is in fluid communication with the extrusion die; and a heating element that melts a filament material drive through the channel so that the melted material is extruded by the extrusion die. The heating element can be helically wound about the channel or extend parallel to the channel, among other configurations. Further, the extrusion assembly includes a temperature sensor that is positioned adjacent to the channel between the extrusion die and the heating element. The channel, heating element, and temperature sensor are enclosed together within a sheath as a single integral unit. An additive manufacturing system utilizing the extrusion assembly can include a drive assembly, a support assembly, and a controller.

16 Claims, 5 Drawing Sheets

(51) Int. Cl.
  *B29C 64/393* (2017.01)
  *B29C 64/245* (2017.01)
  *B29C 48/50* (2019.01)
  *B29C 48/02* (2019.01)
  *B29C 48/92* (2019.01)
  *B29C 48/68* (2019.01)
  *H05B 3/46* (2006.01)
  *B29C 48/875* (2019.01)
  *B29C 48/25* (2019.01)
  *B29C 48/80* (2019.01)
  *B29C 48/05* (2019.01)
  *B33Y 10/00* (2015.01)
  *B29C 64/118* (2017.01)
  *B33Y 30/00* (2015.01)

(52) U.S. Cl.
  CPC .......... *B29C 48/50* (2019.02); *B29C 48/6801* (2019.02); *B29C 48/6803* (2019.02); *B29C 48/832* (2019.02); *B29C 48/875* (2019.02); *B29C 48/92* (2019.02); *B29C 64/245* (2017.08); *B29C 64/393* (2017.08); *H05B 3/46* (2013.01); *B29C 48/834* (2019.02); *B29C 64/118* (2017.08); *B29C 64/209* (2017.08); *B29C 2948/924* (2019.02); *B29C 2948/92209* (2019.02); *B29C 2948/92704* (2019.02); *B29C 2948/92895* (2019.02); *B33Y 10/00* (2014.12); *B33Y 30/00* (2014.12)

(56) References Cited

U.S. PATENT DOCUMENTS

| | | | |
|---|---|---|---|
| 5,157,241 A * | 10/1992 | Hehl | B29C 45/74 |
| | | | 219/535 |
| 7,897,074 B2 | 3/2011 | Batchelder et al. | |
| 8,439,665 B2 | 5/2013 | Batchelder et al. | |
| 8,815,141 B2 | 8/2014 | Swanson et al. | |
| 2012/0018924 A1 | 1/2012 | Swanson et al. | |
| 2017/0232674 A1 | 8/2017 | Mark | |
| 2019/0099950 A1* | 4/2019 | MacNeish, III | B29C 64/295 |
| 2019/0152154 A1* | 5/2019 | Mantell | B29C 64/227 |

\* cited by examiner

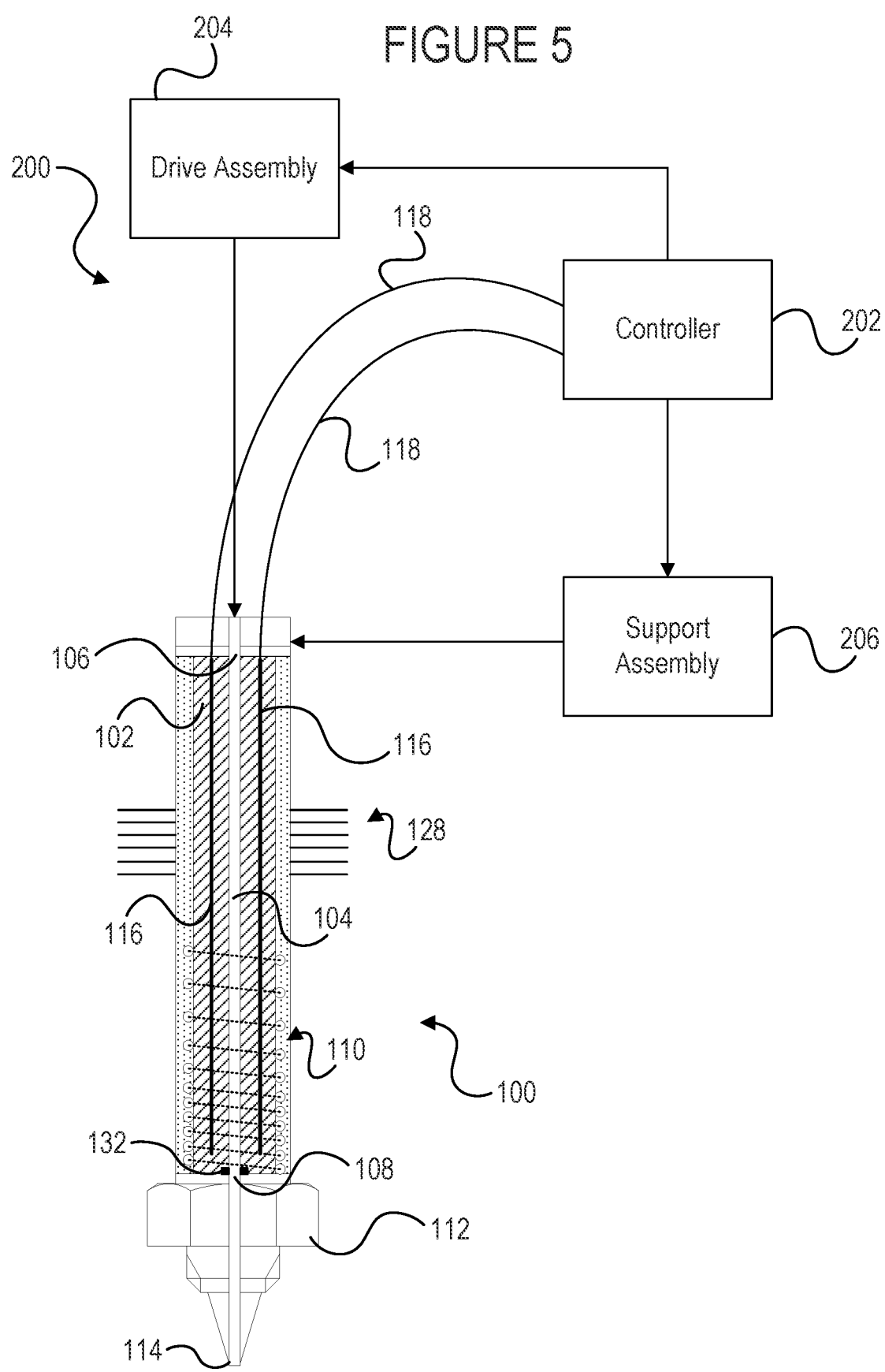

EXTRUSION ASSEMBLY FOR AN ADDITIVE MANUFACTURING SYSTEM

BACKGROUND

Traditional heated nozzle assemblies for additive manufacturing systems (i.e., 3D printer systems) have the disadvantage of the heater and the temperature sensor not being in intimate contact with the material being heated. This is because the heater is typically mounted in a block near the extrusion tube assembly, rather than being in direct contact with or within the extrusion tube assembly itself. Such configurations result in uneven heating, less precise temperature control, and heat and energy losses from the surface of the tool because the temperature sensor is not accurately reading the temperature of the melted material. Furthermore, the inefficient heat transfer forces the heater of the additive manufacturing system to run at much higher temperatures, which places more thermal strain on the components of the system and thus results in shorter life for the system.

While several devices have been made and used, it is believed that no one prior to the inventors has made or used the device described in the appended claims.

SUMMARY

In one general aspect, the present invention is directed to an extrusion assembly for use with an additive manufacturing system for constructing three-dimensional objects from a melted source material. The extrusion assembly includes an extrusion die; a channel having an inlet and an outlet, which is in fluid communication with the extrusion die; and a heating element that melts a filament material drive through the channel so that the melted material is extruded by the extrusion die. The heating element can be helically wound about the channel or extend parallel to the channel, among other configurations. Further, the extrusion assembly includes a temperature sensor that is positioned adjacent to the channel between the extrusion die and the heating element. The channel, heating element, and temperature sensor can then be enclosed together by a sheath.

In another general aspect, the present invention is directed to an additive manufacturing system including the extrusion assembly described above; a drive assembly for supplying a filament material to the extrusion assembly; a support assembly for moving the extrusion assembly; and a controller. The controller can be programmed to move the support assembly to cause the extrusion assembly to form a three-dimensional object from the filament material.

In another general aspect, the present invention is directed to a method of constructing an extrusion assembly for an additive manufacturing system. The method comprises the steps of: (1) inserting a heating element and a temperature sensor into a crushable core comprising a channel; (2) mechanically compacting the crushable core such that the heating element and the temperature sensor fixed in place within the crushable core and the temperature sensor is positioned adjacently to the channel; and (3) attaching an extrusion die such that the extrusion die is in fluid communication with an outlet of the channel and the temperature sensor is positioned between the heating element and the extrusion die. The crushable core can be mechanically compacted via pressing, swaging, and other such techniques known in the field.

FIGURES

The features of various aspects are set forth with particularity in the appended claims. The various aspects, however, both as to organization and methods of operation, together with further objects and advantages thereof, may best be understood by reference to the following description, taken in conjunction with the accompanying drawings as follows.

FIG. 5 illustrates an additive manufacturing system including the extrusion die assembly, according to one aspect of this disclosure.

DESCRIPTION

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting examples aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and are not to limit the scope thereof.

Figure 1:
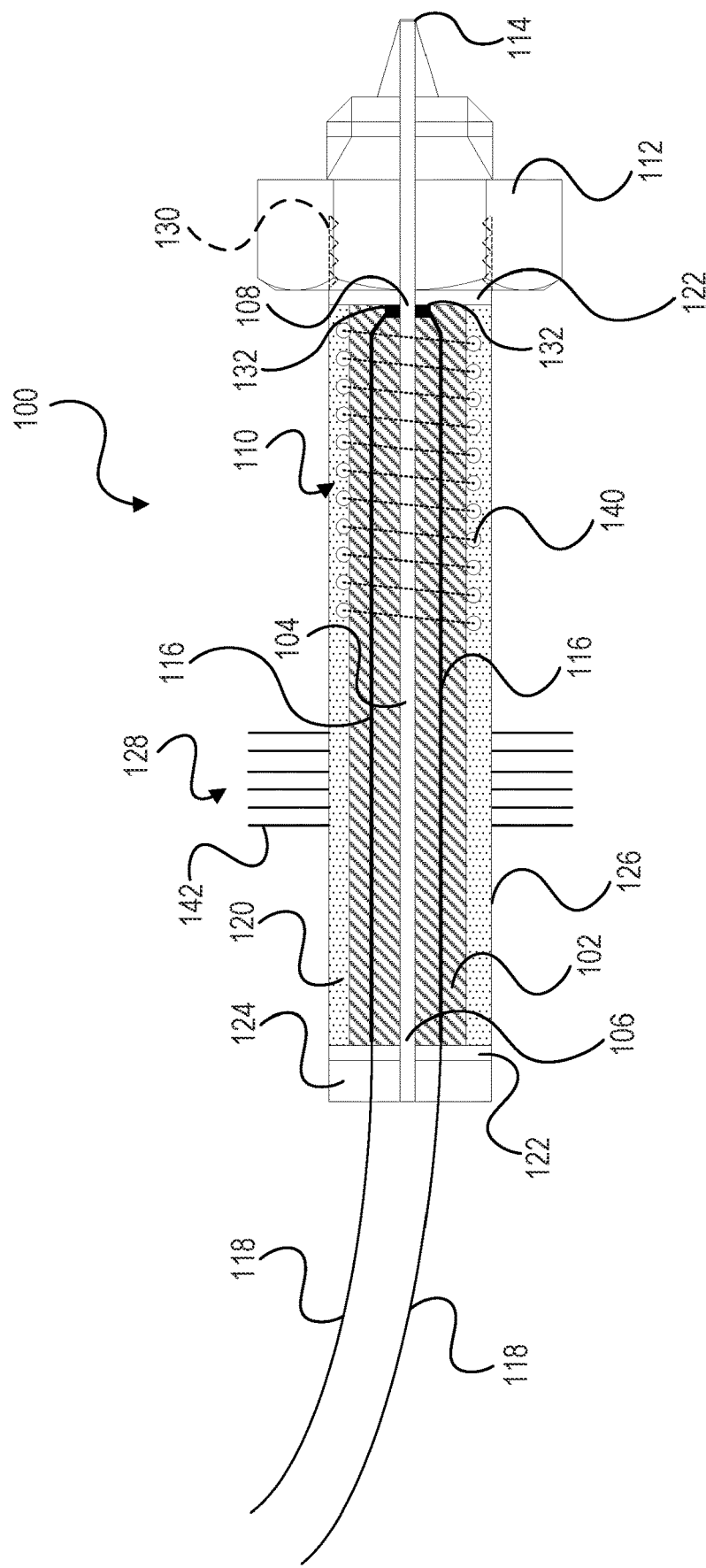
FIG. 1 illustrates a longitudinal sectional view of an extrusion die assembly, according to one aspect of this disclosure.

FIG. 1 illustrates a longitudinal sectional view of an extrusion assembly 100, according to one aspect of this disclosure. The extrusion assembly 100 can be utilized, e.g., in metal or plastic applications of additive manufacturing systems. The extrusion assembly 100 includes a channel 104 extending through a core 102, a heating element 110 positioned to melt material that is driven through the extrusion channel 104, and an extrusion die 112 in fluid communication with the extrusion channel 104. The extrusion channel 104 includes an inlet 106 through which a filament of a material suitable for use in additive manufacturing, such as a thermoplastic or a metal, is fed and an outlet 108 that is in fluid communication with the extrusion die 112. The extrusion channel 104 can be constructed from or lined with, e.g., a metallic material. In some embodiments, the extrusion channel 104 can be constructed from different materials along its length in order to prevent or lessen heat migration from the outlet 108 of the extrusion channel 104 to its inlet 106. The extrusion channel 104 can be circular, triangular, rectangular, or any other shape in cross-section. In the depicted embodiment, the diameter or width of the extrusion channel 104 is uniform along its length. In another embodiment, the inlet 106 has a larger cross-sectional area than the outlet 108, forming a generally funnel-shaped extrusion channel 104. The extrusion channel 104 can have a diameter or width of, e.g., 3 mm or 1.75 mm. In additive manufacturing systems, a filament of material is mechanically fed into the extrusion assembly 100, whereupon the material is melted by the heating element 110 as it is driven from the inlet 106 to the outlet 108. The additive manufacturing system then moves either the extrusion assembly 100 or a platform situated below the extrusion assembly 100 as the melted material is extruded through the extrusion die 112 according to instructions executed by a control system to fabricate a three-dimensional object layer-by-layer with the extruded material.

The extrusion assembly 100 further includes one or more temperature sensors 132 positioned within the core 102 of the extrusion assembly 100, between the heating element 110 and the extrusion die 112 and adjacent to the outlet 108 of the channel 104. The extrusion assembly 100 is constructed such that the heating element 110, the temperature sensors 132, the channel 104, and the extrusion die 112 are combined within a single, integral unit, as opposed to having the aforementioned components being located disjointedly in the additive manufacturing system. Furthermore, the extrusion assembly 100 can further be mechanically compacted during fabrication (as described in further detail below) in order to ensure that the aforementioned components are positioned tightly with respect to each other. Fabricating the extrusion assembly 100 in this manner provides more efficient heat transfer from the heating element 110 and more precise temperature control due to the temperature sensors 132 being in intimate contact the outlet 108 of the channel 104, which prolongs the life of the extrusion assembly 100. In one embodiment, the temperature sensors 132 are biased (via, e.g., a spring) towards the distal end of the secondary channels 116 in which they are placed so that they tightly contact the extrusion die 112 when the extrusion die 112 is affixed to the rest of the assembly.

Figure 2A:
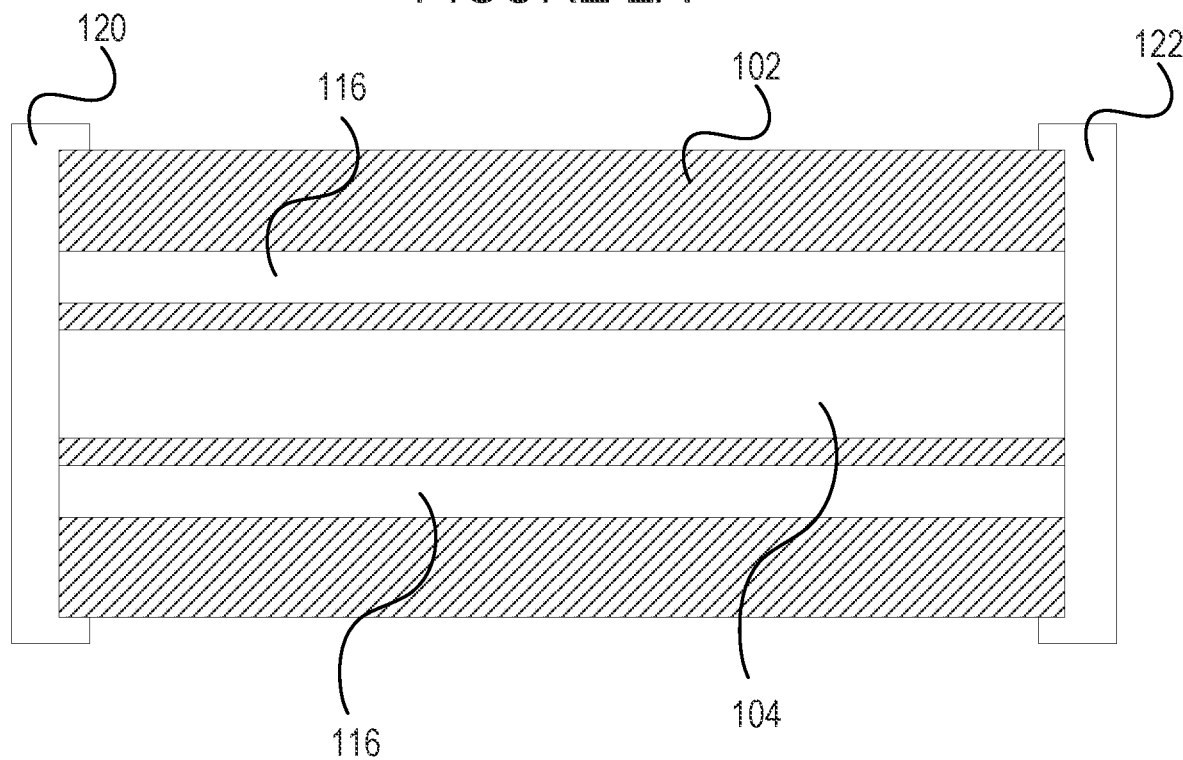
FIG. 2A illustrates a longitudinal sectional view of a crushable core, according to one aspect of this disclosure.
Figure 2B:
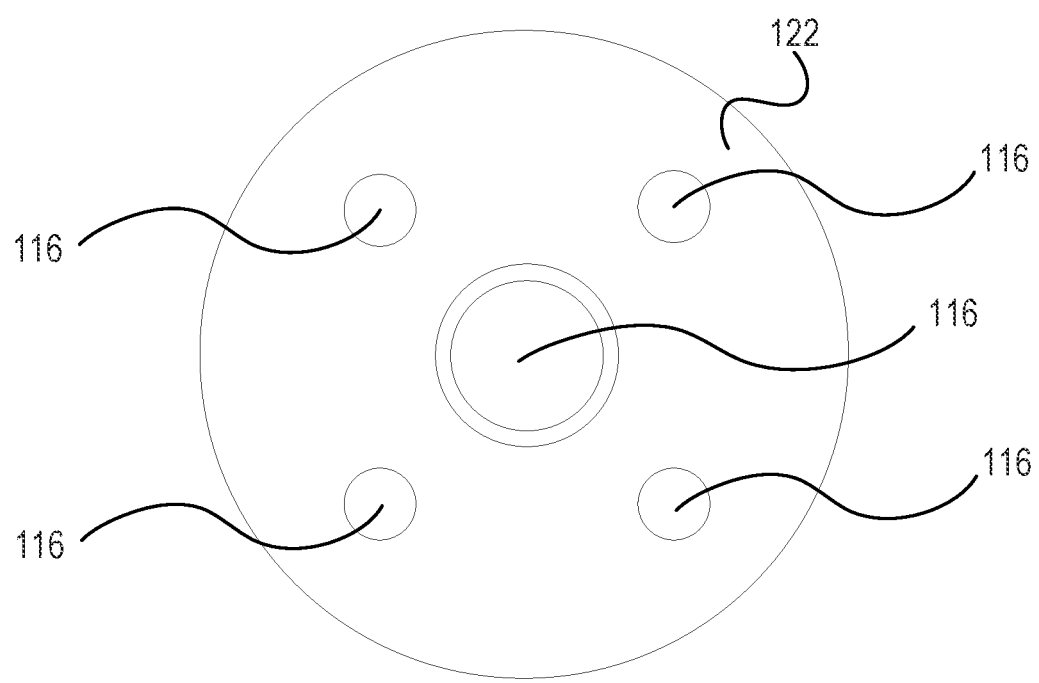
FIG. 2B illustrates an end sectional view of a crushable core, according to one aspect of this disclosure.

As can be seen in greater detail in FIGS. 2A and 2B, the core 102 includes one or more secondary channels 116 extending parallel to the extrusion channel 102 through which the filament of material is transmitted to the extrusion die 112. The secondary channels 116 can support both the temperature sensors 132 therein and the associated electrical wiring 118 connecting the temperature sensors 132 to the control system of the additive manufacturing system. Although FIGS. 2A and 2B depict the core 102 as including four secondary channels 116, the core 102 can include any number of second channels 116 that support a corresponding number of temperature sensors 132 and their associated electrical wiring 118. The temperature sensors 132 can include, e.g., thermocouples, thermistors, resistance temperature detectors, and combinations thereof. The core 102 can be constructed from an electrically insulative material (e.g., a dielectric material) in order to electrically insulate the heating element 110 from the tubing of the extrusion channel 104 and the sheath 126.

Figure 3:
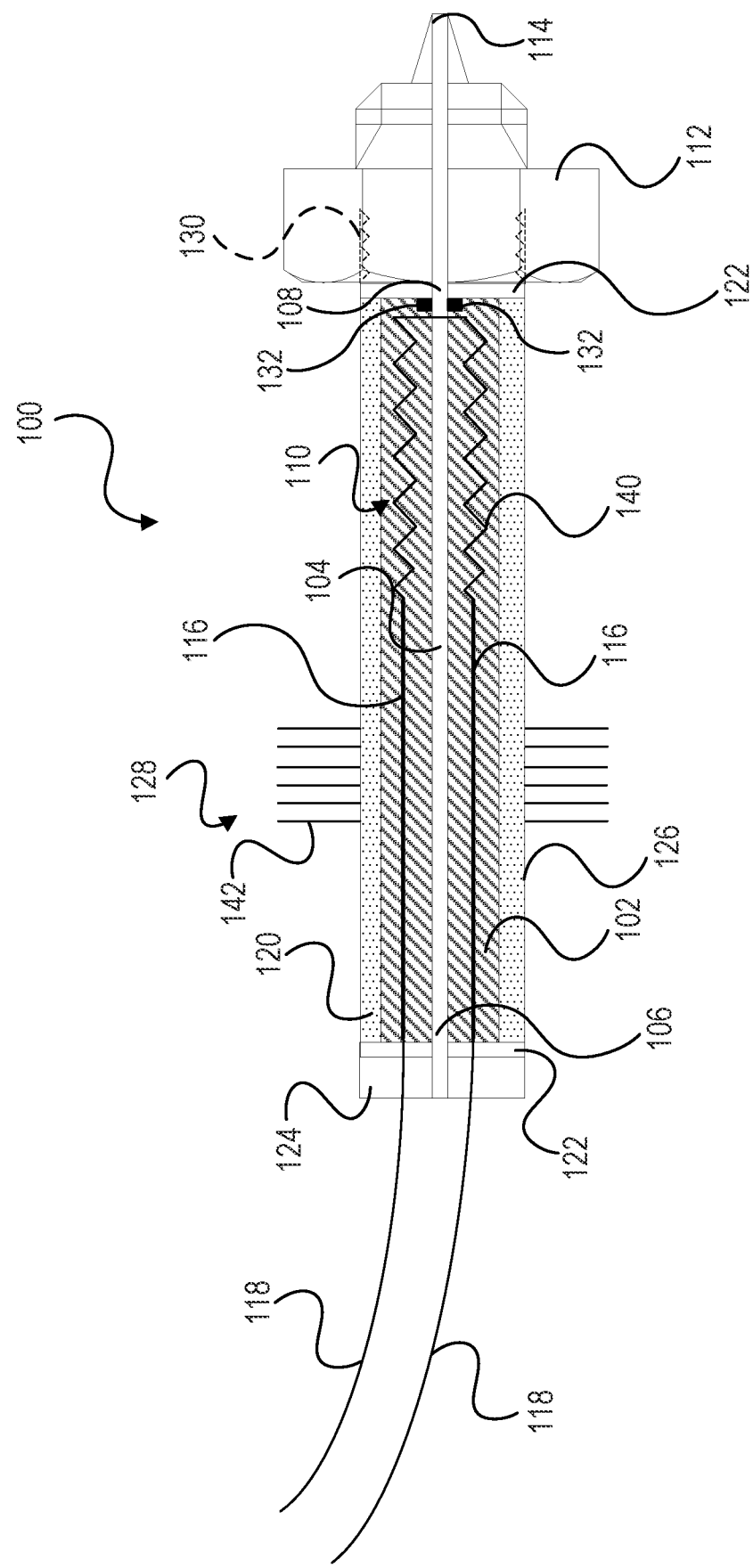
FIG. 3 illustrates a longitudinal sectional view of an extrusion die assembly having heating elements arranged parallel to the channel, according to one aspect of this disclosure.

In the depicted embodiment of the extrusion assembly 100 depicted in FIG. 1, the heating element 110 comprises a resistance wire 140 that is helically wound about the core 102. In an alternative embodiment depicted in FIG. 3, the heating element 110 comprises one or more resistance wires 140 that extend parallel along the length of the channel 104 within the core 102. In other embodiments, the heating element 110 can comprise resistive heating elements, conductive heaters, and any other type of heater that is capable of generating a thermal gradient to heat material for additive manufacturing. The resistance wires 140 can be constructed from, e.g., nickel chromium.

In one embodiment, the extrusion assembly 100 is constructed by inserting one or more temperature sensors 132 through each of the corresponding secondary channels 116, such that each of the temperature sensors 132 is positioned at a distal end of the core 102, adjacent to the outlet 108 of the extrusion channel 104 (i.e., adjacent to the end of the extrusion channel 104 that is coupled to the extrusion die 112). In one embodiment, the temperature sensors 132 are additionally positioned between the heating element 110 and the extrusion die 112. In one embodiment, each of the temperature sensors 132 includes a biasing member (e.g., a spring) that is likewise inserted into the respective secondary channels 116 for biasing the temperature sensors 132 against the extrusion die 112 during fabrication of the extrusion assembly 100. The electrical wiring 118 for each temperature sensor 132 can be threaded through the secondary channels 116 so that the electrical wiring 118 extends beyond the inlet 106 and can thus then be connected to the control system of the additive manufacturing system for receiving signals from the temperature sensors 132. In one embodiment, a centering ring 122 is then attached to each of the ends of the core 102 to fix the components in place. Once the temperature sensors 132 are secured, the core 102 is mechanically compacted. The core 102 can be constructed from, e.g., crushable ceramic materials, such as magnesium oxide. The mechanical compaction process can include rolling, pressing, swaging, vibration, slurry compaction (wherein the temperature sensors 132, electrical wiring 118, and other components are embedded in the slurry prior to sintering), and other techniques known in the field. Mechanically compacting the core 102 with the temperature sensors 132 therein brings the temperature sensors 132 tight against the extrusion channel 104 so that the temperature sensors 132 are positioned directly adjacently to the point where the melted filament material is being extruded through the die 112. This arrangement allows the control system of the additive manufacturing system to precisely monitor the temperature of the material being extruded.

In an alternative embodiment, the temperature sensors 132 are positioned externally to the core 102, adjacent to the outlet 108. In this embodiment, the temperature sensors 132 can be positioned on the external surface of the distal end of the core 102, such that when the extrusion die 102 is attached to the core, the temperature sensors 132 are fixed in place due to the force exerted on the core 102 and/or other components of the extrusion assembly 100 by the extrusion die 112.

The core 102 can be mechanically compacted before or after the heating element 110 is applied to the extrusion assembly 100. In one embodiment, the heating element 110 is applied to the exterior of the core 102 after the core 102 is compacted. For example, in the embodiment depicted in FIG. 1, the heating element 110 comprises a resistance wire 140 that is applied to the core 102 by helically winding the heating element 110 therearound. In an alternative embodiment, the heating element core 102 is compacted after the heating element 110 is applied to (i.e., wound helically about) the exterior of the core 102. In another embodiment, the heating element 110 is inserted through the secondary channels 116 along with the temperature sensor(s) 132 and associated electrical wiring 118 prior to the core 102 being mechanically compacted. For example, in the embodiment depicted in FIG. 3, the heating element 110 comprises one or more resistance wires 140 that are inserted through the secondary channels 116 such that the heating element 110 extends longitudinally along the extrusion channel 104. In this embodiment, the core 102 is mechanically compacted after the heating element 110, temperature sensor 132, and electrical wiring 118 are placed within the secondary channels 116.

In some embodiments, a dielectric filling 120 and a sheath 126 can then be fitted over the assembly. The sheath 126 can be constructed from a metal material, such as stainless steel or Incoloy. The dielectric filling 120 prevents current leakage from the heating element 110, electrical wiring 118, and other electrical components within the extrusion assembly 100. The dielectric filling 120 includes, e.g., magnesium oxide powder. A seal 124 can then be utilized to cap the sheath 126, dielectric filling 120, core 102, and other such components of the extrusion assembly 100 in order to fix the components in place. The seal 124 includes, e.g., a rubber, epoxy, or fluoropolymer material. The sheath 126 encloses the heating element 110 and the temperature sensors 132 within a single unit or structure, such that they are in close proximity to the extrusion channel 104.

The extrusion assembly 100 can further include a cooling assembly 128 that is configured to dissipate thermal energy generated by the heating element 110 in order to prevent the generated thermal energy from migrating from the extrusion assembly 100 to the support assembly and other components of the additive manufacturing system. The cooling assembly 128 can be positioned proximally on the extrusion assembly 100 relative to the heating element 110, wherein the extrusion die 112 represents the distal end of the extrusion assembly 100. In the depicted embodiment, the cooling assembly 128 includes cooling fins 142 extending axially from the sheath 126. The cooling fins can be arranged, e.g., helically about the sheath 126. The cooling fins 142 can be attached to the sheath 126 by, e.g., brazing or crimping. Furthermore, the number and position of the cooling fins can vary in various embodiments. In other embodiments, the cooling assembly 128 can include a heat sink, a fan, and other cooling devices in addition to or in lieu of the cooling fins 142.

In some embodiments, the extrusion die 112 can be integrally affixed to the core 102. In other embodiments, the extrusion die 112 can be replaceable and thus removably affixable to the core 102. For example, in the embodiment depicted in FIGS. 1, 3, and 4, the extrusion die 112 is removably affixable to the core 102 via complementary threading 130. The opening 114 of the extrusion die 112 can vary in size and shape according to the desired application of the additive manufacturing system. For example, the opening 114 can have a width or diameter greater than or equal to 0.2 mm in some embodiments. The opening 114 can be circular, triangular, rectangular, or any other shape.

In alternative embodiments, the temperature sensors 132 can be positioned on the exterior of the core 102, centering ring 122, or sheath 126 adjacent to the extrusion die 112. Such embodiments can be useful for applications where it is desired for the temperature sensors 132 to be easily replaceable.

Figure 4:
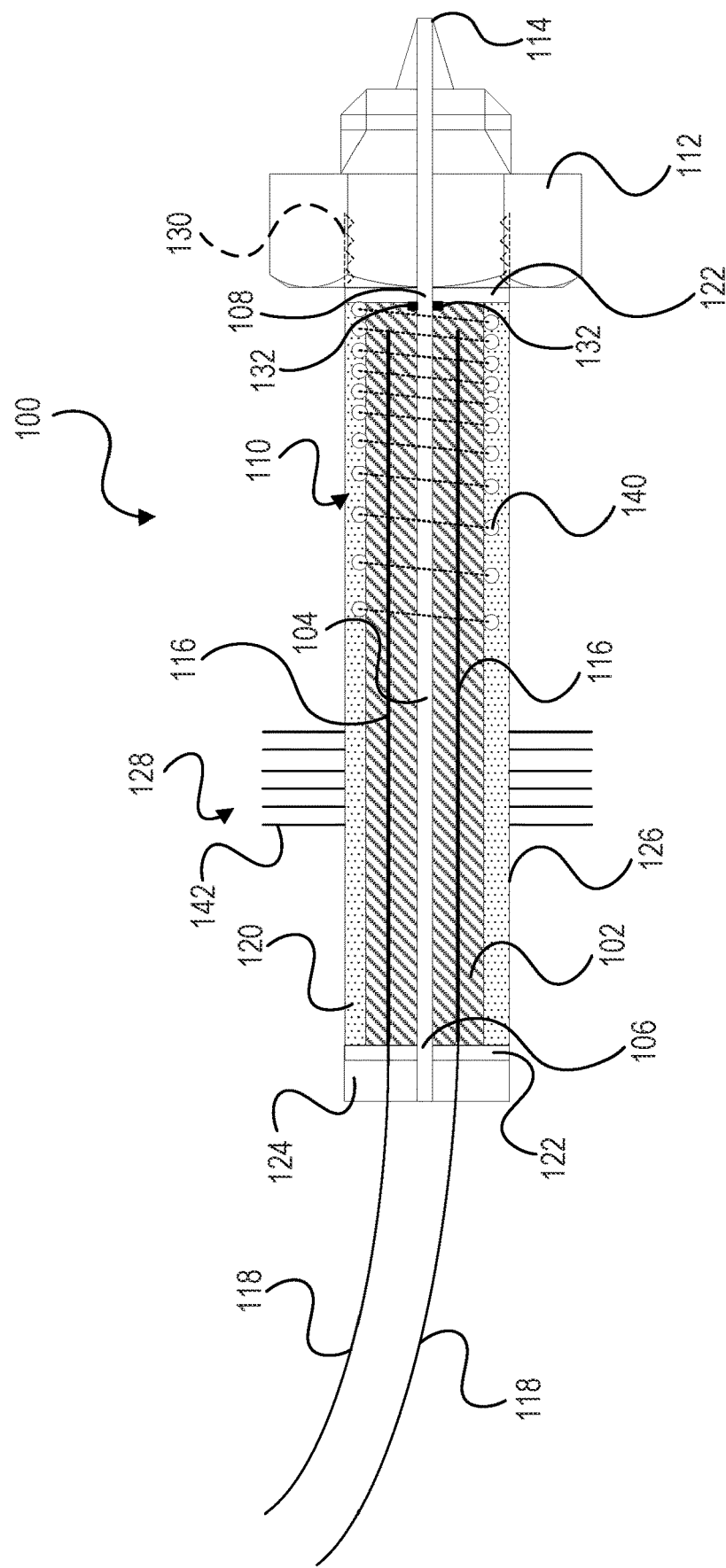
FIG. 4 illustrates a longitudinal sectional view of an extrusion die assembly having a heating element with a variable thermal gradient, according to one aspect of this disclosure.

FIG. 4 illustrates a longitudinal sectional view of an extrusion die assembly 100 having a heating element 110 with a variable thermal gradient, according to one aspect of this disclosure. In some applications, it may be desirable for the heating element 110 to generate a variable thermal gradient (i.e., a non-uniform temperature) along the length of the extrusion channel 104 in order to provide customized heat up and melt profiles for different applications of the additive manufacturing system and/or different materials. In the embodiment depicted in FIG. 4, the pitch of the helical heating element 110 decreases towards the outlet 108 of the extrusion channel 104, i.e., the turns of the helical resistance wire 140 grow tighter together. As the turns of the resistance wire 140 grow tighter, the density of the thermal energy generated by the heating element 110 increases. Therefore, the heating element 110 generates an increasingly higher temperature towards the outlet 108 of the extrusion channel 104. Other embodiments can include various other arrangements of the heating element 110 to provide a variable thermal gradient.

FIG. 5 illustrates an additive manufacturing system 200 including the extrusion die assembly 100 illustrated and described in connection with, e.g., FIG. 4, according to one aspect of this disclosure. The additive manufacturing system 200 includes a drive assembly 204 that feeds the filament material to the extrusion assembly 100, a support assembly 206 that movably supports the extrusion assembly 100, and a controller 202 that is communicably coupled to the drive assembly 204, the support assembly 206, the temperature sensor 132 (via, e.g., the electrical wiring 118), and the heating element 110. The drive assembly 204 can mechanically feed the filament material into the inlet 106 of the extrusion assembly 100, such as via a motor that drives a pulley system, which in turn drives the filament material. In some embodiments, the drive assembly 204 further includes a system for pre-heating the filament material prior to the material being fed into the extrusion assembly 100. The support assembly 206 includes a support structure (e.g., gantry) that supports the extrusion assembly 100 above a substrate or platform onto which the extrusion assembly 100 extrudes the melted filament material to form a three-dimensional object. The support assembly 206 can be configured to move horizontally (i.e., along an x-axis and a y-axis) and/or vertically (i.e., along a z-axis) according to control signals transmitted by the controller 202. In alternative embodiments, the support assembly 206 is static and the controller 202 instead causes the platform to move beneath the extrusion assembly 100 supported aloft by the support assembly 206.

The controller 202 can include a processor executing program instructions stored in a memory to move the support assembly 206 (or alternatively, the platform beneath the support assembly 206) in a manner that builds a three-dimensional object from material extruded by the extrusion assembly 100. The program instructions executed by the controller 202 can utilize, e.g., a CAD file or another computer-based representation of a three-dimensional image, to generate the appropriate control signals to move the support assembly 206 and/or platform.

Although various aspects have been described herein, many modifications and variations to those aspects may be implemented. For example, different types of heating elements, control systems, and cooling systems may be employed. Also, where materials are disclosed for certain components, other materials may be used. The foregoing description and following claims are intended to cover all such modification and variations.

The invention claimed is:

1. An extrusion assembly for an additive manufacturing system, the extrusion assembly comprising:
   an extrusion die;
   a compacted core material;
   a channel extending through the compacted core material and comprising an inlet and an outlet, the outlet in fluid communication with the extrusion die;
   a heating element extending along the channel for melting a filament material received through the inlet such that the filament material can be extruded through the extrusion die;

a temperature sensor positioned within the compacted core material, adjacent to the channel between the extrusion die and the heating element;

wherein the compacted core material holds the temperature sensor in contact against the channel at the outlet; and a sheath enclosing the compacted core material, the channel, the heating element, and the temperature sensor.

2. The extrusion assembly of claim 1, wherein the heating element is dielectrically isolated from the channel.

3. The extrusion assembly of claim 1, wherein the heating element is coiled about the compacted core material.

4. The extrusion assembly of claim 1, wherein the heating element extends parallel to the channel.

5. The extrusion assembly of claim 1, wherein the heating element comprises a resistance wire.

6. The extrusion assembly of claim 1, wherein the temperature sensor is selected from the group consisting of a thermistor, a thermocouple, a resistance temperature detector, and combinations thereof.

7. The extrusion assembly of claim 1, wherein the heating element provides a thermal gradient along the channel.

8. The extrusion assembly of claim 1, wherein the compacted core material holds the temperature sensor in contact with the extrusion die.

9. An additive manufacturing system comprising:
an extrusion assembly comprising:
   an extrusion die;
   a compacted core material;
   a channel extending through the compacted core material and comprising an inlet and an outlet, the outlet in fluid communication with the extrusion die;
   a heating element extending along the channel for melting a filament material received through the inlet such that the filament material can be extruded through the extrusion die;
   a temperature sensor positioned within the compacted core material, adjacent to the channel between the extrusion die and the heating element;
   wherein the compacted core material holds the temperature sensor in contact against the channel at the outlet; and
   a sheath enclosing the compacted core material, the channel, the heating element, and the temperature sensor;
a drive assembly for supplying a filament material to the extrusion assembly;
a support assembly for moving the extrusion assembly; and
a controller programmed to move the support assembly according to program instructions executed thereby to cause the extrusion assembly to form a three-dimensional object from the filament material.

10. The additive manufacturing system of claim 9, wherein the heating element is dielectrically isolated from the channel.

11. The additive manufacturing system of claim 9, wherein the heating element is coiled about the compacted core material.

12. The additive manufacturing system of claim 9, wherein the heating element extends parallel to the channel.

13. The additive manufacturing system of claim 9, wherein the heating element comprises a resistance wire.

14. The additive manufacturing system of claim 9, wherein the temperature sensor comprises a thermistor.

15. The additive manufacturing system of claim 9, wherein the heating element provides a thermal gradient along the channel.

16. The additive manufacturing system of claim 9, wherein the compacted core material holds the temperature sensor in contact with the extrusion die.

* * * * *